United States Patent
Davidson et al.

(10) Patent No.: US 6,292,934 B1
(45) Date of Patent: *Sep. 18, 2001

(54) METHOD AND SYSTEM FOR IMPROVING THE LOCALITY OF MEMORY REFERENCES DURING EXECUTION OF A COMPUTER PROGRAM

(75) Inventors: Robert I. Davidson; Nathan Myhrvold, both of Bellevue; Keith Randel Vogel, Duvall; Gideon Andreas Yuval, Mercer Island; Richard Shupak; Norman Eugene Apperson, both of Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/846,893
(22) Filed: May 1, 1997

Related U.S. Application Data

(63) Continuation of application No. 08/268,277, filed on Jun. 30, 1994, now Pat. No. 5,664,191.

(51) Int. Cl.[7] ...................................................... G06F 9/45
(52) U.S. Cl. ........................................ 717/4; 717/8; 717/9
(58) Field of Search ................................ 395/704; 717/4, 717/9, 8

(56) References Cited

U.S. PATENT DOCUMENTS

| | | | |
|---|---|---|---|
| 4,047,243 | 9/1977 | Dijkstra | 364/200 |
| 4,642,765 | 2/1987 | Cocke et al. | 364/300 |
| 4,656,583 | 4/1987 | Auslander et al. | 364/300 |
| 4,731,740 | 3/1988 | Eguchi | 364/200 |

(List continued on next page.)

OTHER PUBLICATIONS

Ball et al., "Optimally Profiling and Tracing Programs," Technical Report #1031, Computer Science Department, University of Wisconsin–Madison, 1991, pp. 1–27.

Baxter et al., "Code Restructuring for Enhanced Performance on a Pipelined Processor," *IEEE*, 252–260, 1991.

Clark et al., "A Linear Time Algorithm for Graph Partition Problems," *Information Processing Letters*, 42(1):19–24, 1992.

(List continued on next page.)

*Primary Examiner*—Mark R. Powell
*Assistant Examiner*—Wei Zhen
(74) *Attorney, Agent, or Firm*—Merchant & Gould

(57) ABSTRACT

The present invention provides a method and system for determining an optimal placement order for basic blocks within a computer program to improve locality of reference and reduce the working set of the computer program. By reducing the working set, the computer program requires less memory than it normally would require to execute on a computer system. The optimal placement order for basic blocks within a computer program reflects the concurrency of usage for basic blocks during execution of the computer program. The method for determining an optimal placement order includes analyzing the computer program to identify all of the basic blocks, determining how many times each basic block is executed, assigning a placement order to each basic block depending upon how many times each basic block was executed, and reordering the basic blocks according to their assigned placement orders to produce an optimized computer program. The method used to identify all of the basic blocks includes disassembling known instruction addresses to identify the beginning and end of basic blocks and processing jump tables to identify more instruction addresses. Processing jump tables includes processing the first entry of every jump table before processing the second entry of any jump table. The present invention further optimizes a computer program by replacing rarely executed instructions with other instructions that require a smaller amount of storage space.

27 Claims, 10 Drawing Sheets

U.S. PATENT DOCUMENTS

| | | | |
|---|---|---|---|
| 4,763,255 | | 8/1988 | Hopkins et al. ..................... 364/300 |
| 4,868,738 | | 9/1989 | Kish et al. ............................ 364/200 |
| 5,212,794 | * | 5/1993 | Pettis et al. .......................... 395/709 |
| 5,274,811 | * | 12/1993 | Borg et al. ........................... 395/704 |
| 5,313,616 | * | 5/1994 | Cline et al. .......................... 395/704 |
| 5,579,520 | * | 11/1996 | Bennett ................................ 395/704 |
| 5,751,945 | * | 5/1998 | Levine et al. .................. 395/184.01 |
| 5,933,640 | * | 8/1999 | Dion ..................................... 395/704 |
| 5,952,942 | * | 9/1999 | Balakrishnan et al. ................ 341/20 |
| 5,966,536 | * | 10/1999 | Ravichandran ...................... 395/709 |
| 6,006,033 | * | 12/1999 | Heisch ................................. 395/709 |

OTHER PUBLICATIONS

Grishman, Ralph, *Assembly Language Programming for the Control Data Series*, 2d ed., Algorithmics Press, New York, N.Y., 1972, pp. 45–53, 176–184.

Guo et al., "A Fast Algorithm for Simulated Annealing," *Physica Scripta*, T38:40–44, 1991.

Johnson et al., "Optimization by Simulated Annealing: An Experimental Evaluation; Part 1, Graph Partitioning," *Operations Research*, 37(6):865–892, 1989.

Johnson, S.C., "Postloading for Fun and Profit," *USENIX*, Winter, pp. 325–330, 1990.

Kernighan et al., "An Efficient Heuristic Procedure for Partitioning Graphs," *The Bell System Technical Journal*, Feb., pp. 291–307, 1970.

Larus et al., "Rewriting Executable Files to Measure Program Behavior," Technical Report #1083, Computer Sciences Department, University of Wisconsin–Madison, 1992, pp. 1–17.

Lee et al., "Efficient Algorithm for Graph–Partitioning Problem Using A Problem Transformation Method," *Computer–Aided Design*, 21(10):611–618, 1989.

Optimite Systems, *PC_Opt, Version 1.1, User's Guide*, Optimite Systems, Dallas, TX, 1992, pp. 1–40.

Pettis et al., "Profile Guided Code Positioning," in Proceedings of the ACM SIGPLAN'90 Conference on Programming Language Design and Implementation, ACM SIGPLAN, White Plains, N. Y., Jun. 20–22, 1990, pp. 16–27.

Samples, Alan D., "Profile Driven Compilation," Dissertation, Computer Science Graduate Division, University of California at Berkeley, 1991, pp. 1, ii–iii, v–iv, 1–179.

Sedgewick, Robert, Addison–Wesley, 1990, *Algorithms in C*, Chapter 31, "Weighted Graphs," pp. 451–468.

Van Den Bout et al., "Graph Partitioning Using Annealed Neural Networks," *IEEE Transactions on Neural Networks*, 1(2):192–203, 1990.

Wall, David W., "Systems for Late Code Modification," WRL Research Report 92/3, Digital Western Research Laboratory, Palo Alto, CA, 1992, pp. i, 1–24.

* cited by examiner

METHOD AND SYSTEM FOR IMPROVING THE LOCALITY OF MEMORY REFERENCES DURING EXECUTION OF A COMPUTER PROGRAM

CROSS-REFERENCE TO RELATED APPLICATION

This application, is a continuation of U.S. patent application Ser. No. 08/268,277, filed Jun. 30, 1994, is now U.S. Pat. No. 5,664,191 now allowed.

TECHNICAL FIELD

The present invention relates generally to a method of and a system for optimizing a computer program and, more particularly, to a method of and a system for improving the locality of memory references during execution of a computer program.

BACKGROUND OF THE INVENTION

Many conventional computer systems utilize virtual memory. Virtual memory refers to a set of techniques that provide a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, but these techniques can be applied to segmentation systems or systems employing paging and segmentation as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system copies the page into main memory from secondary memory and then restarts the instruction that caused the fault.

One paging model that is commonly used is the working set model. At any instance in time, t, there exists a working set, w(k, t), consisting of all the pages used by the k most recent memory references. The operating system monitors the working set of each process and allocates each process enough page frames to contain the process' working set. If the working set is larger than the allocated page frames, the system will be prone to thrashing. Thrashing refers to very high paging activity in which pages are regularly being swapped from secondary memory into the pages frames allocated to a process. This behavior has a very high time and computational overhead. It is therefore desirable to reduce the size of (i.e., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the linker program has no knowledge or concern for the working set of the resultant executable code. The linker program merely orders the instructions within the executable code in the order in which the instructions are encountered in the object code. The computer program and linker program do not have the information required to make an optimal placement of code portions within an executable module. This is because the information required can only be obtained by actually executing the executable module and observing its usage of code portions. Clearly this cannot be done before the executable module has been created. The executable module initially created by the compiler and linker thus has code portions laid out without regard to their usage.

As each code portion is executed, the page in which it resides must be in physical memory. Other code portions residing on the same page will also in memory, even if they may not be executed in temporal proximity. The result is a collection of pages in memory with some required code portions and some unrequited code portions. To the extent that unrequired code portions are loaded into memory by this process, valuable memory space is wasted, and the total number of pages loaded into memory is much larger than necessary.

SUMMARY OF THE INVENTION

In a preferred embodiment, the present invention provides a method and system for determining an optimal placement order for basic blocks within a computer program to improve locality of reference and reduce the working set of the computer program. By reducing the working set, the computer program requires less memory than it normally would require to execute on a computer system. According to the present invention, the optimal placement order for basic blocks within a computer program reflects the concurrency of usage for basic blocks during execution of the computer program. The method for determining an optimal placement order includes analyzing the computer program in machine code format to identify all of the basic blocks, determining how many times each basic block is executed, assigning a placement order to each basic block depending upon how many times each basic block was executed, and reordering the basic blocks according to their assigned placement orders to produce an optimized computer program.

To identify all of the basic blocks that make up the computer program, the present invention first gathers known instruction addresses from available sources such as program entry points, export entry tables, symbolic debug information, and even user input. The present invention then disassembles the instructions at these addresses and identifies all basic blocks that are encountered during the disassembly process. After identifying all basic blocks that are encountered during the disassembly process, the present invention processes jump tables to identify more instruction addresses. A jump table is a table of addresses that are destinations of a transfer instruction that indexes into the jump table. The present invention processes jump tables in a breadth-first manner, that is, the first entry in every jump table is processed before the second or subsequent entries in any jump table. After identifying more instruction addresses while processing jump tables, the present invention then disassembles the instructions at these addresses and identifies all basic blocks that are encountered during the disassembly process.

The present invention further optimizes a computer program by replacing rarely executed instructions with other instructions that require a smaller amount of storage space. For example, a conditional branch instruction typically occupies 5–6 bytes of storage space, while a conditional branch-to-self instruction typically occupies 2 bytes of storage space. After using the previously-described methods to identify and separate frequently executed code blocks from rarely executed code blocks, conditional branches from the frequently executed code blocks to the rarely executed code blocks may be identified and replaced by conditional branch-to-self instructions. For each replacement, a savings of 3–4 bytes of storage space is realized. The execution of a conditional branch-to-self instruction results in an execution of an "infinite loop" when the condition is met (i.e., transfer to a rarely executed code block). A monitor process detects when a program is executing such an infinite loop and causes the program to branch to the rarely executed code.

DETAILED DESCRIPTION OF THE INVENTION

In a preferred embodiment, the present invention provides a method and system for determining an optimal placement order for basic blocks within a computer program to improve locality of reference and reduce the working set of the computer program. By reducing the working set, the computer program requires less main memory than it normally would require to execute on a computer system.

For purposes of this detailed description, the term "computer program" refers to any program or library of routines capable of executing on a computer system. "Basic block" refers to, for example, a series of one or more machine instructions having one and only one entrance instruction, i.e., where control enters the block, and one and only one exit instruction, i.e., where control exits the block. The identification of basic blocks within a computer program will be discussed below in more detail. "Placement order" refers to the order of basic blocks within a computer program.

According to the present invention, the optimal placement order for basic blocks within a computer program reflects the concurrency of usage for basic blocks during execution of the computer program. When determining the optimal placement order for each basic block, the present invention 1) executes an instrument ed version of the computer program to collect execution data for each basic block, 2) analyzes the execution data to determine the optimal placement order for each basic block, and 3) links the basic blocks according to the determined optimal placement order. The instrument ed version of the computer program contains instructions that, when executed, cause execution data to be recorded. When the basic blocks that make up a computer program are reordered according to the determined optimal placement order, overall program locality is improved and the working set for the computer program is reduced, thereby reducing page and cache faults and improving program performance.

In modem computer systems, performance is typically improved by including an additional, smaller high-speed memory cache between the primary memory and the processor. Just as equal-sized pages are used to transfer code portions from secondary memory into primary memory, so are equal-sized cache lines used to transfer code portions from primary memory into the cache. This forms an hierarchy of memories for accessing program code: cache, primary memory, and secondary memory, with each level of the hierarchy being successively larger and slower. The improvements of this invention which have been described above likewise reduce the number of cache lines needed to old the computer program's basic blocks in the cache during its execution.

Figure 1:
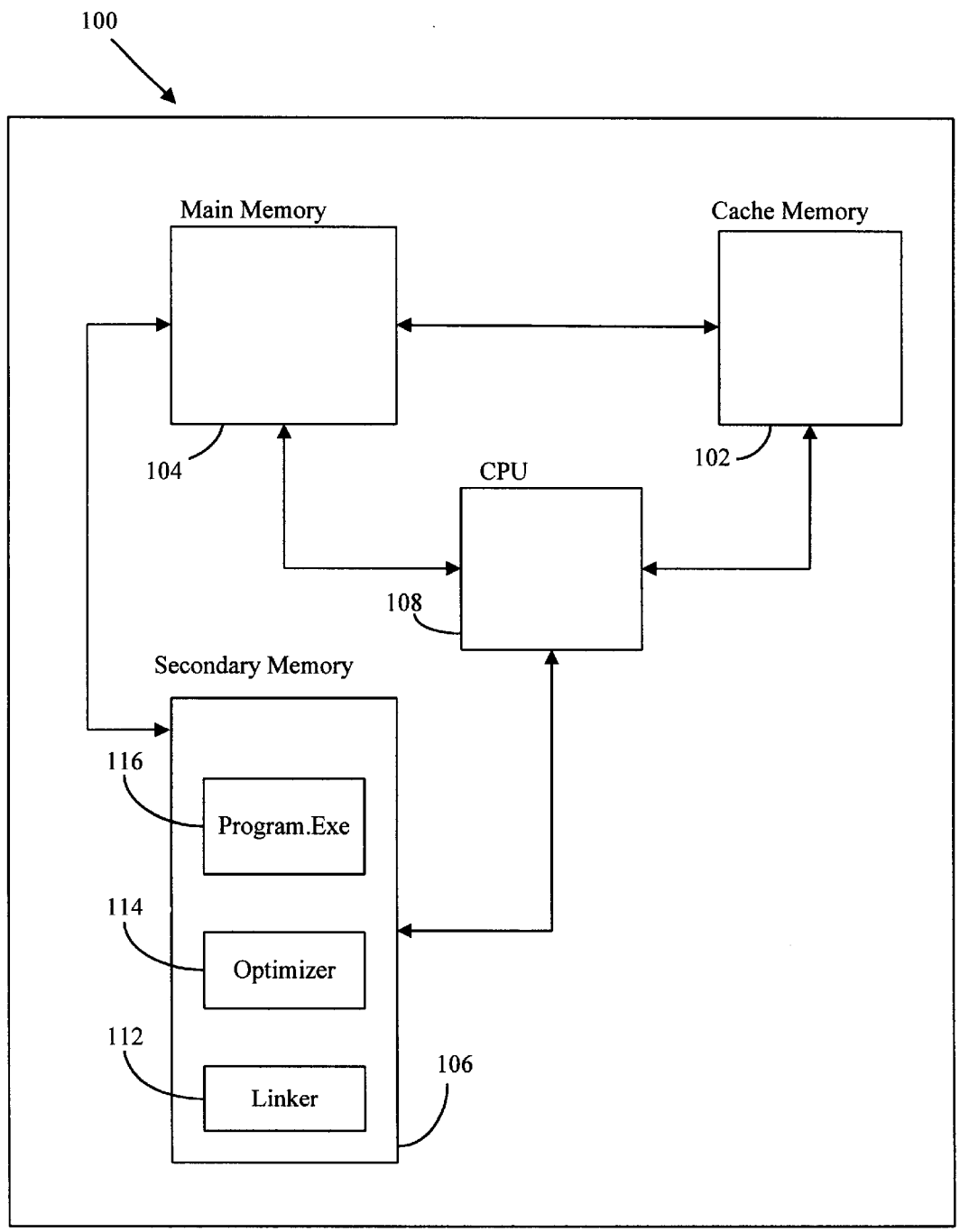
FIG. 1 is a block diagram of a computer system configured to implement a preferred embodiment of the present invention.

FIG. 1 is a block diagram of a computer system 100 configured to implement a preferred embodiment of the present invention. The computer system 100 includes a cache memory 102, a main memory 104, a secondary memory 106, and a central processing unit 108. A basic block linker program 112 and an optimizer program 114 are stored within the secondary memory 106, but are loaded into the main memory 104 to be executed. A conventionally compiled and linked computer program 116 is also stored within the secondary memory 106. When the computer program 116 is executed on the computer system 100, the present invention records execution data for each basic block in the computer program 116. The optimizer program 114 then analyzes the recorded execution data for each basic block to determine the optimal placement order for each basic block. The basic block linker program 112 creates an optimized computer program by reordering the basic blocks according to the determined optimal placement order.

Figure 2:
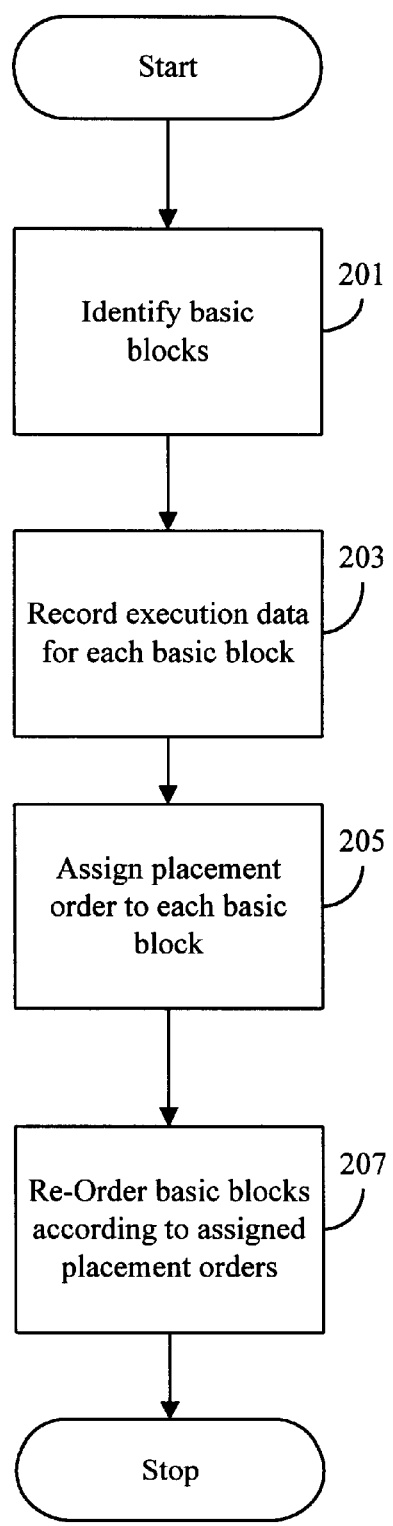
FIG. 2 is an overview flow diagram of a process carried out by an optimizer program in a preferred embodiment of the present invention.

FIG. 2 is an overview flow diagram of a method for determining an optimal placement order for basic blocks within the computer program 116 and then reordering the basic blocks according to the determined optimal placement order to produce an optimized computer program in accordance the preferred embodiment of the present invention. The method includes analyzing the computer program 116 to identify all of the basic blocks (step 201); determining how many times each basic block is executed (step 203); assigning a placement order to each basic block based upon how many times the basic block was executed (step 205); and reordering the basic blocks according to their assigned placement orders to produce an optimized computer program (step 207). Each of these steps is discussed in more detail below.

Figure 3:
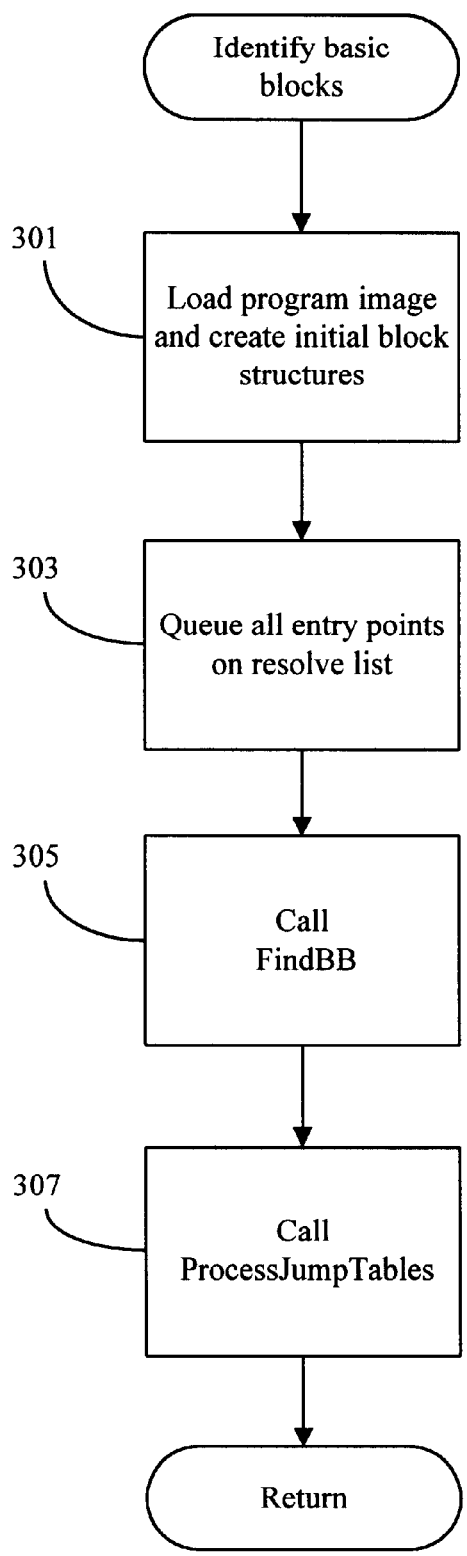
FIG. 3 is a flow diagram of a method for identifying basic blocks in accordance with a preferred embodiment of the present invention.

In step 201 of FIG. 2, the optimizer program 114 analyzes the computer program 116 to identify each basic block. The method used in a preferred embodiment to identify all of the basic blocks is described with reference to FIGS. 3–5. FIG. 3 is a flow diagram of a method for identifying basic blocks in accordance with a preferred embodiment of the present invention. Prior to the present invention, it was difficult if not impossible for one computer program to determine precisely which portions of another computer program contain data and which portions contain instructions. The present invention gathers information such as entry point addresses, and then analyzes the computer program using this information. In step 301, the optimizer program 114 causes the computer program 116 to be loaded into the main memory 104. In step 303, the optimizer program 114 gathers information that includes addresses known to be instructions, and queues these addresses on a resolve list for later examination. These addresses can be gathered from any available sources, such as program entry points, export entry tables, symbolic debug information, and even user input.

After the known instruction addresses are gathered, the basic block identification process begins. In step 305, a routine FindBB retrieves an address from the resolve list, disassembles the instruction at that address, and then identifies all basic blocks that are encountered during the disassembly process. The routine FindBB is explained below in more detail with reference to FIG. 4. FindBB continues retrieving addresses and disassembling the addresses until the resolve list is empty. When the resolve list is empty, there are no known instruction addresses left to disassemble. In step 307, after FindBB has identified all basic blocks that are encountered during the disassembly process, the optimizer program 114 begins analyzing jump tables to identify the remaining basic blocks not associated with known addresses in the resolve list. Each entry in a jump table contains an address of an instruction. Jump tables can be generated by a compiler and typically have the following form:

| | JMP *(BaseAddress + index) |
| | {pad bytes} |
| BaseAddress | &(TARGET1) |
| | &(TARGET2) |
| | . |
| | . |
| | . |
| | &(TARGETn) |
| | {pad bytes} |
| TARGET1 | . |
| | . |
| | . |
| | {pad bytes} |
| TARGETn | . |
| | . |
| | . |

Notice the appearance of pad bytes at various locations within the above code. For performance reasons, a compiler program typically inserts pad bytes to align code and data to a specific address. In the above code example, a jump table containing "n" entries is located at the label "BaseAddress." The starting address of a jump table is its base address. The instruction "JMP *(BaseAddress+index)" jumps to one of the "Targetn" labels indirectly through the jump table. The "index" indicates which entry in the jump table to jump through. A jump table may also be used by an indirect call instruction. Also, as shown above, the first entry in a jump table typically points to code that is located immediately after the jump table and a jump table typically follows a basic block having an indirect branch exit instruction.

Due to the complexities and problems associated with jump table analysis, the optimizer program 114 uses special processing for jump tables. A routine ProcessJumpTable identifies instructions referenced by jump table entries. As new instruction addresses are identified by the jump table analysis, ProcessJumpTable calls FindBB to disassemble the instructions at those addresses and identify all basic blocks that are encountered during the disassembly process. The routine ProcessJumpTable is explained below in more detail with reference to FIG. 5.

Figure 4:
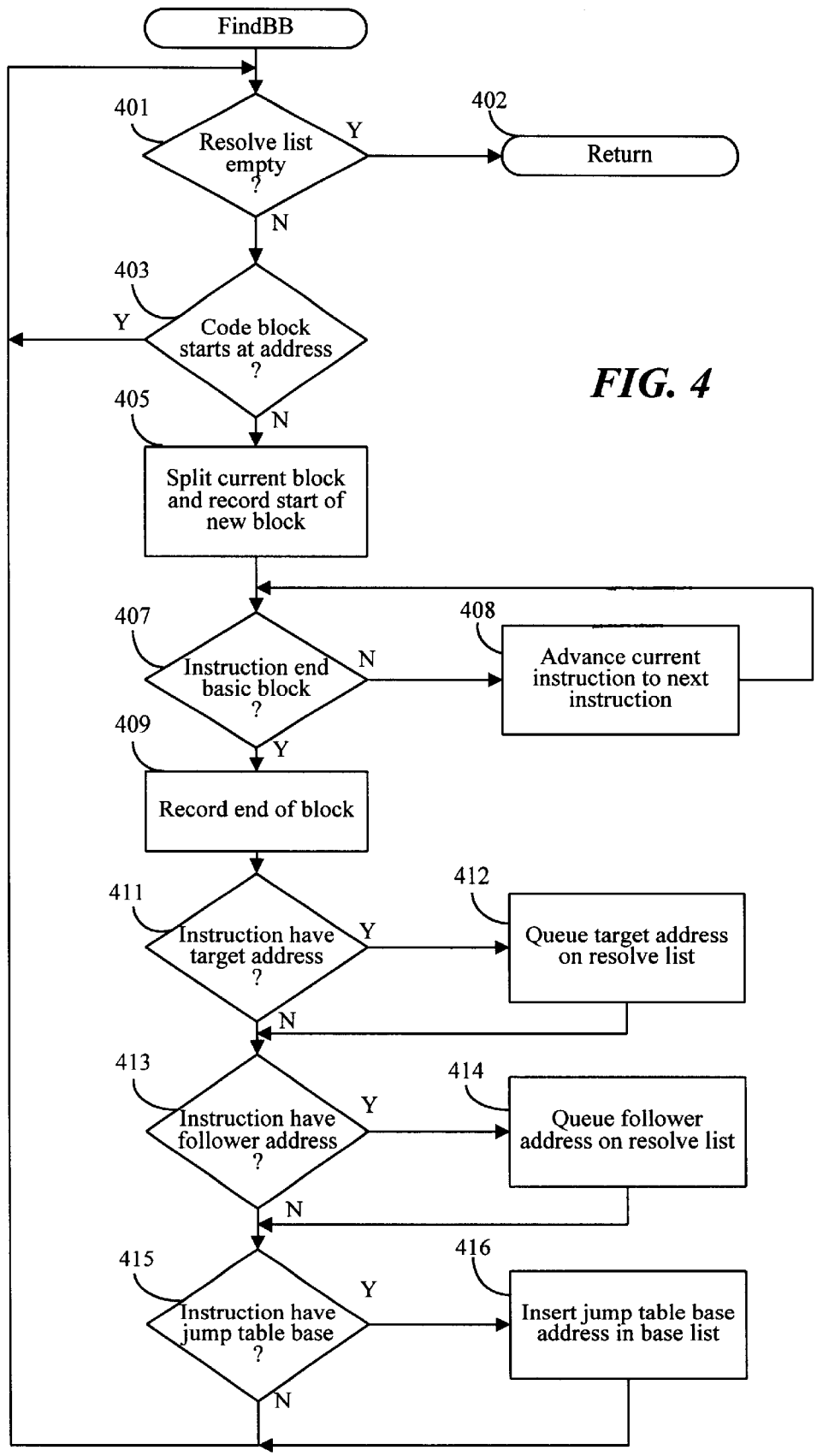
FIG. 4 is a flow diagram of a routine FindBB used to identify basic blocks in accordance with a preferred embodiment of the present invention.

FIG. 4 is a flow diagram of the routine FindBB in accordance with a preferred embodiment of the present invention. In step 401, FindBB determines whether the resolve list contains any addresses. As explained above, known instruction addresses are stored on the resolve list. If the resolve list does not contain any addresses, then FindBB is done. If the resolve list is not empty, then, in step 403, FindBB removes an instruction address from the resolve list and scans a list of known code blocks to determine whether a known code block starts at this instruction address. The list of known code blocks contains addresses of labeled instructions. For example, referring to the above example code for a jump table, the labels "Target1" and "Targetn" indicate the start of code blocks. If a block starts at the instruction address, there is no need to re-examine the address so FindBB loops back to step 401. If a known code block does not start at the instruction address, then the instruction address must be the start of a new code block. In step 405, FindBB splits the known or unknown code block that contains the instruction address and records the instruction address as the start of a new basic block. In steps 407 and 408, FindBB sequentially disassembles the instructions that follow the start of the new basic block until a transfer exit instruction is found. A transfer exit instruction is any instruction that may cause a transfer of control to another basic block. Examples of such exit instructions include branches, conditional branches, traps, calls, and returns. When a transfer exit instruction is found, in step 409, FindBB records the address of the exit instruction as the end of the new code block. All addresses within range of the previously identified block that follow the exit instruction of the newly identified basic block become another new basic block.

In steps 411–414, FindBB determines the follower and target addresses, if any, for the new code block, and queues the follower and target addresses on the resolve list for later examination. A follower address is the address of an entrance instruction of a "fall through" block; that is, no branch or jump instruction is needed to access the block. A target address is the address of an instruction for a block of code that is the destination of a branch or jump instruction. If the exit instruction for the new block is an indirect jump or call instruction, then FindBB determines whether a jump table may start at the base address of the instruction. Because jump tables required special handling, in steps 415 and 416, FindBB stores the base address of the termination instruction in a base list. Each entry in the base list contains an address and an index into a jump table. The entries in the base list are sorted by index value so that the first entry in the list has the lowest index. Whenever a base address is added to the base list, the corresponding index value is set to zero. The index value corresponds to the entry in the jump table that will be processed next as discussed below. FindBB then loops back to step 401 to examine the next address on the resolve list, if more addresses exist.

As mentioned above, FindBB uses special processing to identify the extent of a jump table. This special processing includes processing all jump tables in a breadth-first manner. That is, a routine ProcessJumpTable processes the first entry in every jump table before processing the second or subsequent entries in any jump table. When FindBB disassembles an instruction that references a jump table, the base address of the jump table is put on the base list (see step 416 of FIG. 4).

Figure 5:
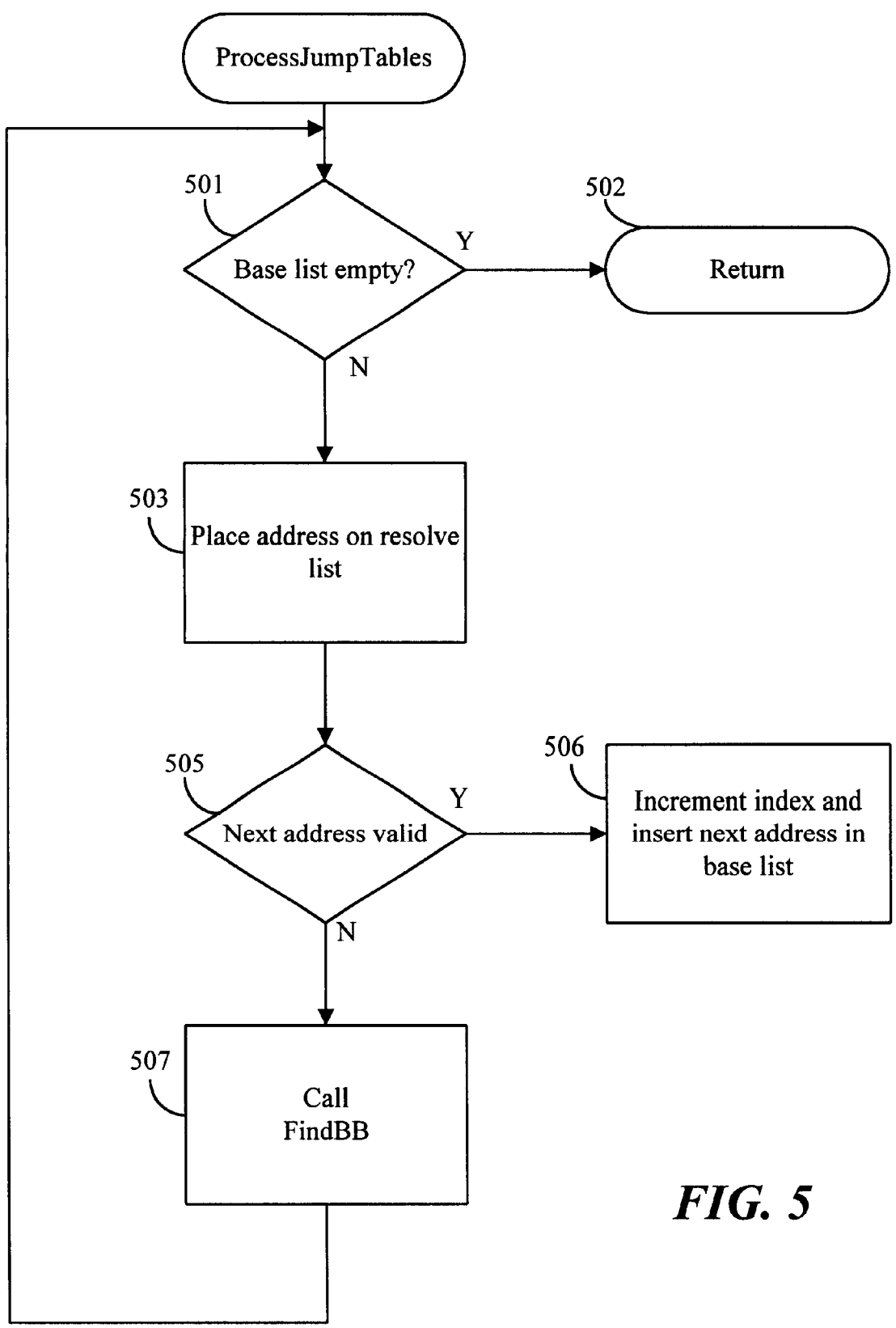
FIG. 5 is a flow diagram of a routine ProcessJumpTable used to process a jump table in accordance with a preferred embodiment of the present invention.

FIG. 5 is a flow diagram of the routine ProcessJumpTable in accordance with a preferred embodiment of the present invention. In step 501, ProcessJumpTable determines whether the base list contains any entries. If the base list does not contain any entries, then ProcessJumpTable ends. If the base list contains one or more entries, then, in step 503, ProcessJumpTable places the address pointed to by the first entry on the resolve list. This address is determined by adding the contents of the base address to the index value. In steps 505 and 506, ProcessJumpTable determines whether the end of the jump table has been reached, and, if not, places the next entry in the jump table onto the base list with the index value incremented. The end of a jump table has been reached when the next address is a pad byte or the entrance instruction of a code block. In step 507, ProcessJumpTable calls the routine FindBB. FindBB may then identify the start of additional jump tables. ProcessJumpTable processes the newly identified jump tables to the same depth as the other jump tables because the base address of a newly identified jump tables is added to the base list in index order. This breadth-first processing of jump tables tends to maximize the chances of identifying a code block that immediately follows a jump table. In this way, ProcessJumpTable ceases processing a jump table when the next address following a jump table entry contains the entrance instruction of a basic block.

Each basic block identified has associated data that includes an address, a size, a unique identifier known as a block identifier ("BID"), a follower block identifier ("BIDFollower"), and target block identifier ("BIDTarget"). Each BIDFollower field contains the BID of a block to which control will pass if a block exits with a fall through condition. Each BIDTarget field contains the BID of a block to which control will pass if a block exits with a branch condition. Referring to example basic blocks shown below in Table A, block "B1" has a size of 17 bytes. Additionally, block "B2" is the follower block of block "B1" and block "B10" is the target block of block "B1." A "nil" value stored in either the BIDFollower or BIDTarget fields indicates no follower or target block, respectively.

TABLE A

| Address | Instruction | Assembled Instruction |
|---------|-------------|------------------------|
| Id: B1 Size: 0x11(17) BidFollower: B2 BidTarget: B10 ||||
| 0075FE00 | 53 | push ebx |
| 0075FE01 | 56 | push esi |

TABLE A-continued

| Address | Instruction | Assembled Instruction |
|---------|-------------|------------------------|
| 0075FE02 | 57 | push edi |
| 0075FE03 | 8B 44 24 14 | mov eax,dword ptr [esp+14] |
| 0075FE07 | 8B F8 | mov edi,eax |
| 0075FE09 | 8B 74 24 18 | mov esi,dword ptr [esp+18] |
| 0075FE0D | 85 F6 | test esi,esi |
| 0075FE0F | 74 30 | je 0075FE41 |
| Id: B2 Size: 0xf(15) BidFollower: B3 BidTarget: nil ||||
| 0075FE11 | C7 06 FF FF FF | mov dword ptr [esi],FFFFFF |
| 0075FE17 | 8B 4C 24 10 | mov ecx,dword ptr [esp+10] |
| 0075FE1B | BB 26 00 00 00 | mov ebx,00000026 |
| Id: B3 Size: 0x4(4) BidFollower: B4 BidTarget: B8 ||||
| 0075FE20 | 38 19 | cmp byte ptr [ecx],bl |
| 0075FE22 | 75 11 | jne 0075FE35 |
| Id: B4 Size: 0x5(5) BidFollower: B5 BidTarget: B7 ||||
| 0075FE24 | 83 3E FF | cmp dword ptr [esi],FF |
| 0075FE27 | 75 0B | jne 0075FE34 |
| Id: B5 Size: 0X5(5) BidFollower: B6 BidTarget: B7 ||||
| 0075FE29 | 38 59 01 | cmp byte ptr [ecx+0.1],bl |
| 0075FE2C | 74 06 | je 0075FE34 |
| Id: B6 Size: 0x6(6) BidFollower: B7 BidTarget: nil ||||
| 0075FE2E | 8B D0 | mov edx,eax |
| 0075FE30 | 2B D7 | sub edx,edi |
| 0075FE32 | 89 16 | mov dword ptr [esi],edx |
| Id: B7 Size: 0x1(1) BidFollower: B8 BidTarget: nil ||||
| 0075FE34 | 41 | inc ecx |
| Id: B8 Size: 0x9(9) BidFollower: B9 BidTarget: B13 ||||
| 0075FE35 | 8A 11 | mov dl,byte ptr [ecx] |
| 0075FE37 | 88 10 | mov byte ptr [eax],dl |
| 0075FE39 | 41 | inc ecx |
| 0075FE3A | 84 D2 | test dl,dl |
| 0075FE3C | 74 1C | je 0075FE5A |
| Id: B9 Size: 0x3(3) BidFollower: nil BidTarget: B3 ||||
| 0075FE3E | 40 | inc eax |
| 0075FE3F | EB DF | jmp 0075FE20 |
| Id: B10 Size: 0xd(13) BidFollower: B11 BidTarget: B13 ||||
| 0075FE41 | 8B 4C 24 10 | mov ecx,dword ptr [esp+10] |
| 0075FE45 | 8A 11 | mov dl,byte ptr [ecx] |
| 0075FE47 | 88 10 | mov byte ptr [eax],dl |
| 0075FE49 | 41 | inc ecx |
| 0075FE4A | 84 D2 | test dl,dl |
| 0075FE4C | 74 0C | je 0075FE5A |
| Id: B11 Size: 0x2(2) BidFollower: B12 BidTarget: nil ||||
| 0075FE4E | 8B FF | mov edi,edi |
| Id: B12 Size: 0xa(10) BidFollower: B13 BidTarget: B12 ||||
| 0075FE50 | 40 | inc eax |
| 0075FE51 | 8A 11 | mov dl,byte ptr [ecx] |
| 0075FE53 | 88 10 | mov byte ptr [eax],dl |
| 0075FE55 | 41 | inc ecx |
| 0075FE56 | 84 D2 | test dl,dl |
| 0075FE58 | 75 F6 | jne 0075FE50 |
| Id: B13 Size: 0x8(8) BidFollower: nil BidTarget: nil ||||
| 0075FE5A | 2B C7 | sub eax,edi |
| 0075FE5C | 5F | pop edi |
| 0075FE5D | 5E | pop esi |
| 0075FE5E | 5B | pop ebx |
| 0075FE5F | C2 0C 00 | ret 000C |

The pseudo code for the method used in a preferred embodiment of the present invention to identify basic blocks is shown below in Table B. The pseudo code illustrates the situation in which the computer program has multiple entry points. The address of the entry points are stored in the table named EPTable.

TABLE B

EntryPointTable (EPTable)-each entry contains an entry point into the program code being
  disassembled
BaseAddressTable (BA Table)-each entry contains a base address of a jump table and an index of the
  next entry to be processed. The entries in the table are sorted by index.
IdentifyBB ( )

```
{      while (EPTable != empty)
              nextEntryPoint = GetEPTable( )
              FindBB (nextEntryPoint)
       endwhile
       while (BA Table != empty)
              GetBA Table (baseAddress, index)
              FindBB (*(baseAddress+index))
              PutBA Table (baseAddress, index + 1)
       endwhile
}
FindBB(Address)

{      startBB (address
       nextAddrews = address
       do
              CurAddress = nextAddress
              disassemble instruction at curAddress
              nextAddress = nextAddress + 1
       while (instruction != end of BB)
       endBB(curaddress)
       if instruction is a jump
              FindBB(address of target of instruction)
       if instruction is conditional jump
              FindBB(address of target of instruction)
              FindBB(address of follower of instruction)
       if instruction is indirect jump or call
              putBA Table(BaseAddress in instruction, 0)

}
PutBA Table(Base Address, index)
{      if (BaseAddress is a fixup &&
              BaseAddress is in code or unknown section
                      store (BaseAddress, index) in BA Table in sorted order by index
}
GetBA Table(Base Address, index)

{      if (BaseAddress is a fixup &&
              BaseAddress is in code or unknown section
                      store (BaseAddress, index) in BA Table in sorted order by index
}
GetBA Table(BaseAddress, index)

{      retrieve BaseAddress with lowest index from BA Table
}
GetEPTable (address)

{      retrieve address stored in next entry of EPTable
}
```

Referring back to FIG. 2, in step 203, the optimizer program 114 records execution data for each basic block during execution of an instrument ed version of the computer program 116. The instrument ed version of the computer program 116 preferably includes instrumentation code in the form of calls to one or more library routines. Instrumentation code may be manually added to the computer program 116, or the optimizer program 114 may automatically insert a call to a library routine into each basic block when the basic block is identified. A library routine is a routine stored in a library file that can be used by any program that can link into the library file. A library routine is typically used so that the same code does not have to be duplicated throughout the instrument ed computer program. After the instrumentation code is added, addresses must be adjusted to account for the added instructions. In a preferred embodiment, the library routine records execution data by causing a counter corresponding to a basic block to be incremented every time the basic block is accessed.

Although the added instructions are preferably in the form of a call to a library routine, this is an optirmization and not necessary to carry out the present invention. The call to the library routine is preferably inserted immediately before the exit instruction of a basic block.

During execution of the instrument ed computer program on the computer system 100, execution data is gathered for each basic block. In one embodiment of the present invention, a user interacts with the instrument ed program while the instrument ed computer program is executing. In another embodiment of the present invention, an executor program interacts with the instrument ed computer program according to a programmed scenario. The scenario may take the form of an execution script.

While instrumentation code may be added to every basic block, a preferred embodiment of the present invention adds instrumentation code only to selected basic blocks, called instrumentation points. When the instrument ed computer program is executed on the computer system, the instrumentation code records execution information for only the basic blocks selected as instrumentation points. The recorded execution information is then used to calculate execution information for the non-instrument ed basic blocks. This method is described in detail in the patent application filed concurrently herewith and entitled "METHOD AND SYSTEM FOR SELECTING INSTRUMENTATION POINTS IN A COMPUTER PROGRAM," which is incorporated herein by reference. Example execution data for each basic block shown in Table A is provided below in Table C.

TABLE C

| Execution Data | Address | Instruction | Assembled Instruction |
|---|---|---|---|
| | Id: B1 Size: 0x11(17) BidFollower: B2 BidTarget: B10 | | |
| 89 | 0075FE00 | 53 | push ebx |
| | 0075FE01 | 56 | push esi |
| | 0075FE02 | 57 | push edi |
| | 0075FE03 | 8B 44 24 14 | move eax,dword ptr [esp+14] |
| | 0075FE07 | 8B F8 | mov edi,eax |
| | 0075FE09 | 8B 74 24 18 | mov esi,dword ptr [esp+18] |
| | 0075FE0D | 85 F6 | test esi,esi |
| | 0075FE0F | 74 30 | je 0075FE41 |
| | Id: B2 Size: 0xf(15) BidFollower: B3 BidTarget: nil | | |
| 89 | 0075FE11 | C7 06 FF FF FF FF | mov dword ptr [esi],FFFFFFFF |
| | 0075FE17 | 8B 4C 24 10 | mov ecx,dword ptr [esp+10] |
| | 0075FE1B | BB 26 00 00 00 | mov ebx,00000026 |
| | Id: B3 Size: 0x4(4) BidFollower: B4 BidTarget: B8 | | |
| 927 | 0075FE20 | 38 19 | cmp byte ptr [ecx],bl |
| | 0075FE22 | 75 11 | jne 0075FE35 |
| | Id: B4 Size: 0x5(5) BidFollower: B5 BidTarget: B7 | | |
| 59 | 0075FE24 | 83 3E FF | cmp dword ptr [esi],FF |
| | 0075FE27 | 75 0B | jne 0075FE34 |
| | Id: B5 Size: 0x5(5) BidFollower: B6 BidTarget: B7 | | |
| 59 | 0075FE29 | 38 59 01 | cmp byte ptr [ecx+01],bl |
| | 0075FE2C | 74 06 | je 0075FE34 |
| | Id: B6 Size: 0x6(6) BidFollower: B7 BidTarget: nil | | |
| 59 | 0075FE2E | 8B D0 | mov edx,eax |
| | 0075FE30 | 2B D7 | sub edx,edi |
| | 0075FE32 | 89 16 | mov dword ptr [esi],edx |
| | Id: B7 Size: 0x1(1) BidFollower: B8 BidTarget: nil | | |
| 59 | 0075FE34 | 41 | inc ecx |
| | Id: B8 Size: 0x9(9) BidFollower: B9 BidTarget: B13 | | |
| 927 | 0075FE35 | 8A 11 | mov dl,byte ptr [ecx] |
| | 0075FE37 | 88 10 | mov byte ptr [eax],dl |
| | 0075FE39 | 41 | inc ecx |
| | 0075FE3A | 84 D2 | test dl,dl |
| | 0075FE3C | 74 1C | je 0075FE5A |
| | Id: B9 Size: 0x3(3) BidFollower: nil BidTarget: B3 | | |
| 838 | 0075FE3E | 40 | inc eax |
| | 0075FE3F | EB DF | jmp 0075FE20 |
| | Id: B10 Size: 0xd(13) BidFollower: B11 BidTarget: B13 | | |
| 0 | 0075FE41 | 8B 4C 24 10 | mov ecx,dword ptr [esp+10] |
| | 0075FE45 | 8A 11 | mov dl,byte ptr [ecx] |
| | 0075FE47 | 88 10 | mov byte ptr [eax],dl |
| | 0075FE49 | 41 | inc ecx |
| | 0075FE4A | 84 D2 | test dl,dl |
| | 0075FE4C | 74 0C | je 0075FE5A |
| | Id: B11 Size: 0x2(2) BidFollower: B12 BidTarget: nil | | |
| 0 | 0075FE4E | 8B FF | mov edi,edi |
| | Id: B12 Size: 0xa(10) BidFollower: B13 BidTarget: B12 | | |
| 0 | 0075FE50 | 40 | inc eax |
| | 0075FE51 | 8A 11 | mov dl,byte ptr [ecx] |
| | 0075FE53 | 88 10 | mov byte ptr [eax],dl |
| | 0075FE55 | 41 | inc ecx |
| | 0075FE56 | 84 D2 | test dl,dl |
| | 0075FE58 | 75 F6 | jne 0075FE50 |

TABLE C-continued

| Execution Data | Address | Instruction | Assembled Instruction |
|---|---|---|---|
| Id: B13 Size: 0x8(8) BidFollower: nil BidTarget: nil | | | |
| 89 | 0075FE5A | 2B C7 | sub eax,edi |
|  | 0075FE5C | 5F | pop edi |
|  | 0075FE5D | 5E | pop esi |
|  | 0075FE5E | 5B | pop ebx |
|  | 0075FE5F | C2 0C 00 | ret 000C |

Referring back to FIG. 2, in step 205 the optimizer program 114 assigns a placement order to each basic block based upon the execution data recorded in step 203. The placement order assigned to a basic block reflects how many times the block is accessed during execution of the instrumented computer program. For example, basic blocks that are rarely accessed (i.e., "dead code") are assigned a low placement order, while basic blocks that are commonly executed (i.e., "live code") are assigned a high placement order. Those skilled in the art will appreciate that many methods exist for determining how many times a basic block will be accessed during execution of a computer program. For example, a programmer with knowledge about when and how often basic blocks are accessed may manually assign placement orders. Alternatively, instrumentation code such as a call to a library routine may be inserted into each basic block to record when the basic block is accessed.

Figure 6:
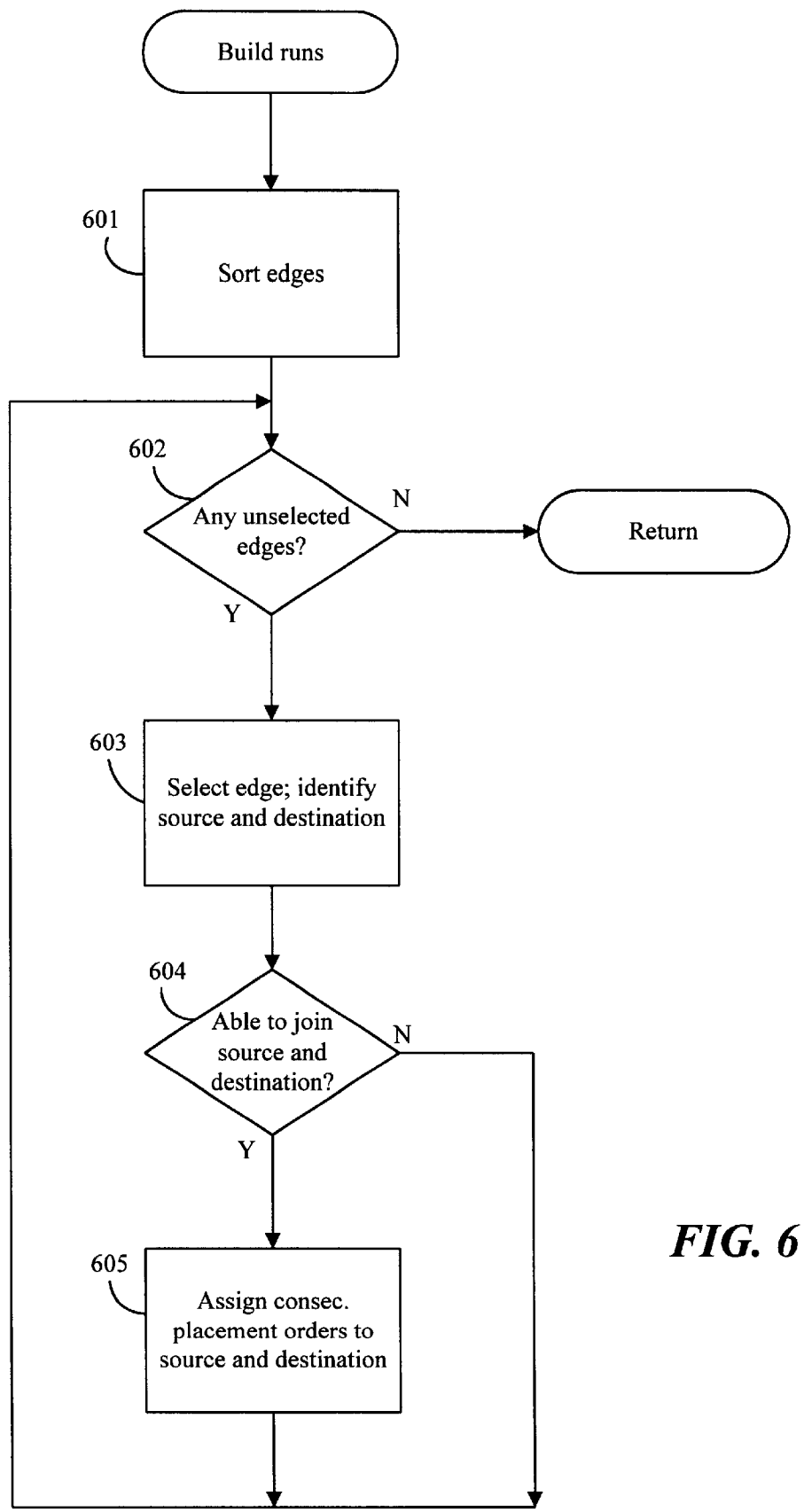
FIG. 6 is an overview flow diagram of a method for determining an optimal placement order using a run builder in accordance with an alternate embodiment of the present invention.

Those skilled in the art will appreciate that many methods exist for determining an optimal placement order for the basic blocks, and those methods may be used separately or in conjunction with the methods described herein. In one embodiment of the present invention, a process called "run building" may be used to order basic blocks in such a way so as to maximize the probability of executing straight line code. Run building improves locality by reducing the number of "jumps" that must be taken. FIG. 6 is an overview flow diagram of a method for determining an optimal placement order using a run builder in accordance with this embodiment of the present invention. In step 601, the run builder orders all edges by execution count. An edge is an exit instruction in a basic block; it defines the flow of control from one block, called a source block, to another block, called a destination block. In steps 602–605, the run builder iterates over each edge, determining whether the edge's source block may be joined with the edge's destination block. If neither the source nor the destination blocks have been previously joined to a different block, then the run builder assigns consecutive placement orders to the source and destination blocks.

Figure 7:
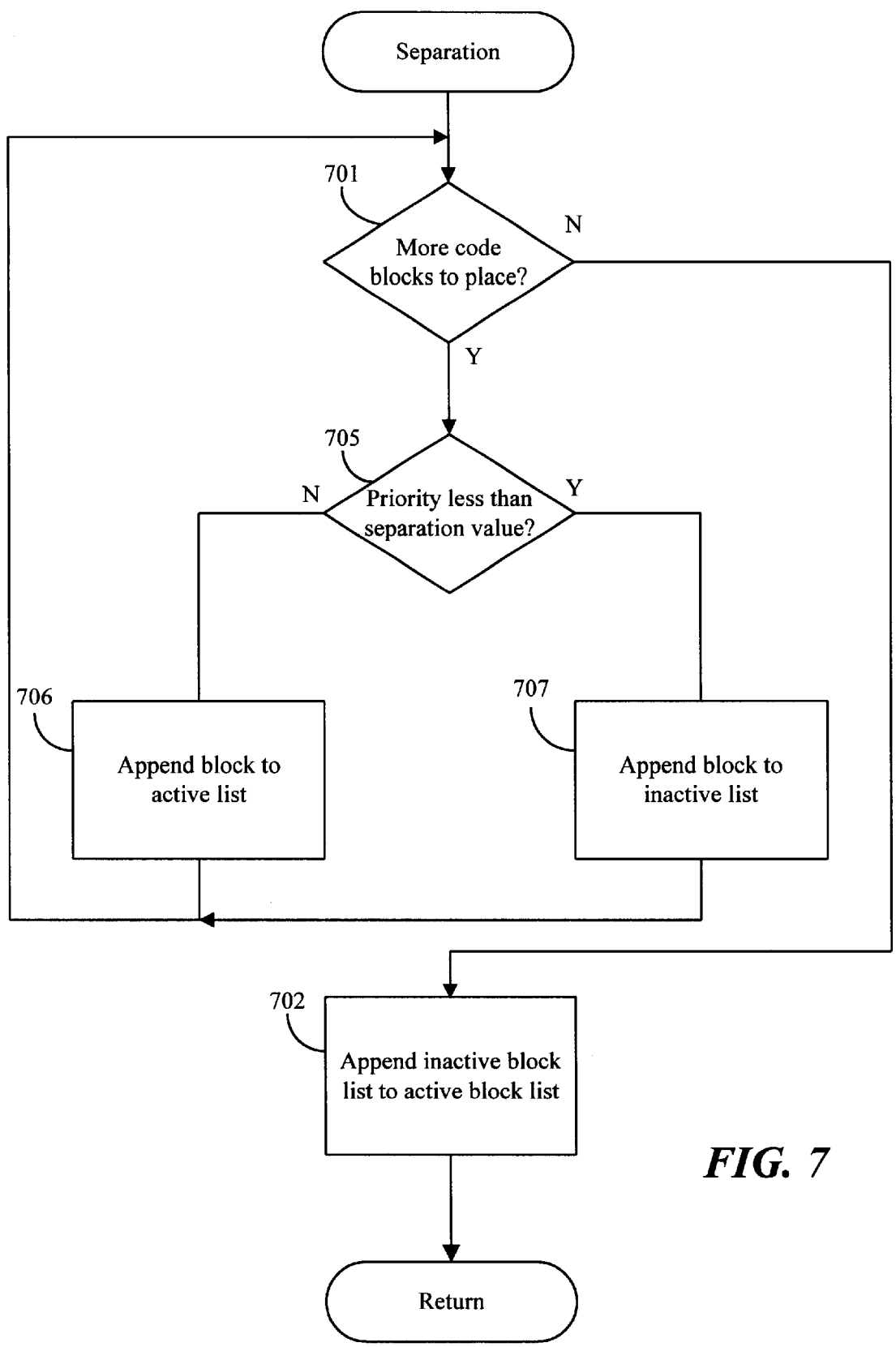
FIG. 7 is an overview flow diagram of a method for determining an optimal placement order using a separator program in accordance with an alternate embodiment of the present invention.

In another embodiment of the present invention, a separation process is used to order blocks in such a way so as to group basic blocks together based on the number of times during execution of the computer program that each basic block is executed. Using the separation process, basic blocks that are executed frequently are grouped together and basic blocks that are executed infrequently are grouped together. FIG. 7 is an overview flow diagram of a method for determining an optimal placement order using a separator program in accordance with this embodiment of the present invention. In step 701, the separator determines whether there are any basic blocks that have not been placed into the optimized computer program. If there are basic blocks that have not been placed into the optimized computer program, then in step 705 the separator selects one of these basic blocks and compares the selected basic block's execution count (part of the execution data) with a predetermined separation value. If the selected basic block's execution count is greater than the predetermined separation value, then in step 706 the separator appends the selected basic block to a list of "active" basic blocks. If the selected basic block's execution count is less than or equal to the predetermined separation value, then in step 707 the separator appends the selected basic block to a list of "inactive" basic blocks. Different numbers may be assigned to the separation value, depending upon the type of block separation desired. For example, if a zero value is used as the predetermined separation value, then dynamically dead code will be separated from dynamically live code.

Figure 8:
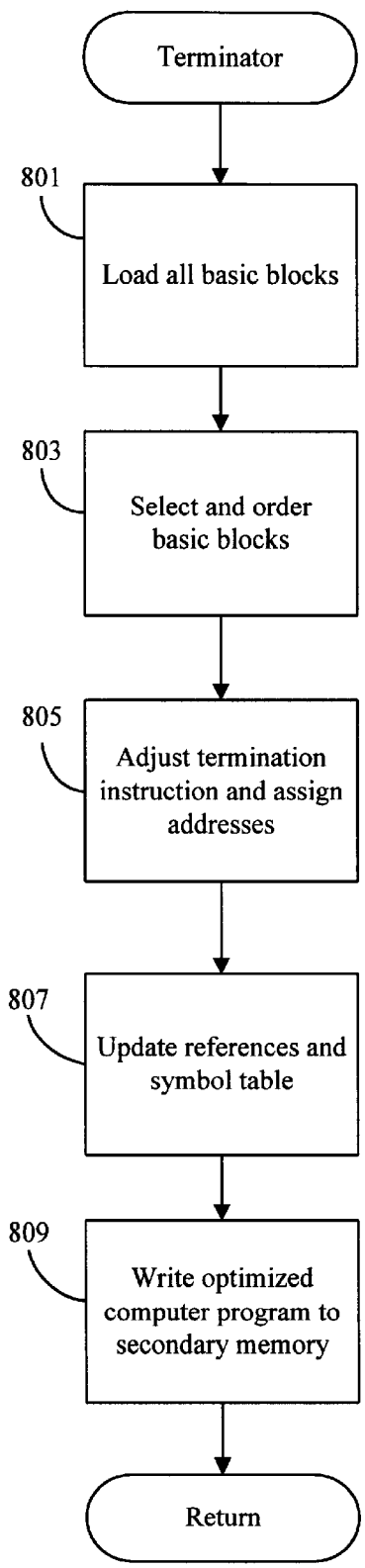
FIG. 8 is an overview flow diagram of a method used by a linker program to reorder basic blocks according to their assigned placement orders.

Referring back to FIG. 2, after an optimal placement order has been determined, in step 207 the basic block linker program 112 produces an optimized computer program by reordering the basic blocks according to the determined optimal placement order. To reorder the basic blocks, the basic block linker ("BBLinker") program 112 re-links the basic blocks according to their assigned placement orders. FIG. 8 is an overview flow diagram of this re-linking process. In step 801, the BBLinker program loads all of the basic blocks in the computer program 116 into the main memory 104. In step 803, the BBLinker program orders the basic blocks according to their assigned placement orders. At this time, the BBLinker also notes the new address of each block. In step 805, the BBLinker reviews the exit instruction of each block to determine if modifications are required to reflect the new address of each basic block, and, if modification are required, makes the necessary modifications. In step 807, the BBLinker modifies any references to the reordered basic blocks to reflect the new ordering and updates the symbol table to reflect the new addresses. Optimization of the computer program 116 is now complete. In step 809, the BBLinker program copies the optimized computer program to the secondary memory 106.

Table D shown below demonstrates some of the code transformations that may be made to the basic blocks shown above in FIG. C. These transformations include grouping frequently executed blocks together, grouping infrequently executed blocks together, adjusting jump instruction indexes, and inverting the test on conditional branches.

TABLE D

| Execution Count | Address | Instruction | Assembled Instruction |
|---|---|---|---|
| | Id: B1 Size: 0x11(17) BidFollower: B2 BidTarget: B10 | | |
| 89 | 0075FE00 | 53 | push ebx |
| | 0075FE01 | 56 | push esi |
| | 0075FE02 | 57 | push edi |
| | 0075FE03 | 8B 44 24 14 | mov eax,dword ptr [esp+14] |
| | 0075FE07 | 8B F8 | mov edi,eax |
| | 0075FE09 | 8B 74 24 18 | mov esi,dword ptr [esp+18] |
| | 0075FE0D | 85 F6 | test esi,esi |
| | 0075FE0F | 74 EC 01 0A 00 | je 00800000 |
| | Id: B2 Size: 0xf(15) BidFollower: B3 BidTarget: nil | | |
| 89 | 0075FE14 | C7 06 FF FF FF FF | mov dword ptr |
| | 0075FE1A | 8B 4C 24 10 | mov ecx,dword ptr [esp+10] |
| | 0075FE1E | 8B 26 00 00 00 | mov ebx,00000026 |
| | Id: B3 Size: 0x4(4) BidFollower: B4 BidTarget: B8 | | |
| 927 | 0075FE23 | 38 19 | cmp byte ptr [ecx],bl |
| | 0075FE25 | 74 14 | je 0075FE3B |
| | Id: B4 Size: 0x9(9) BidFollower: B5 BidTarget: B7 | | |
| 927 | 0075FE27 | 8A 11 | mov dl,byte ptr [ecx] |
| | 0075FE29 | 88 10 | mov byte ptr [eax],dl |
| | 0075FE2B | 41 | inc ecx |
| | 0075FE2C | 84 D2 | test dl,dl |
| | 0075FE2E | 74 03 | je 0075FE33 |
| | Id: B5 Size: 0x3(3); BidFollower: 86 BidTarget: B7 | | |
| 838 | 0075FE30 | 40 | inc eax |
| | 0075FE31 | EB DF | jmp 0075FE23 |
| | Id: B6 Size: 0x8(8) BidFollower: B7 BidTarget: nil | | |
| 89 | 0075FE33 | 2B C7 | sub eax,edi |
| | 0075FE35 | 5F | pop edi |
| | 0075FE36 | 5E | pop esi |
| | 0075FE37 | 5B | pop ebx |
| | 0075FE38 | C2 0C 00 | ret 000C |
| | Id: B7 Size: 0x5(5) BidFollower: B8 BidTarget: nil | | |
| 59 | 0075FE3B | 83 3E FF | cmp dword ptr [esi],FF |
| | 0075FE3E | 75 0B | jne 0075FE4A |
| | Id: B8 Size: 0x5(5) BidFollower: B9 BidTarget: B13 | | |
| 59 | 0075FE40 | 38 59 01 | cmp byte ptr [ecx+01],bl |
| | 0075FE43 | 74 06 | je 0075FE4A |
| | Id: B9 Size: 0x6(6) BidFollower: nil BidTarget: B3 | | |
| 59 | 0075FE45 | 8B D0 | mov edx,eax |
| | 0075FE47 | 2B D7 | sub edx,edi |
| | 0075FE49 | 89 16 | mov dword ptr [esi],edx |
| | Id: B10 Size: 0x1(1) BidFollower: B11 BidTarget: B13 | | |
| 59 | 0075FE4B | 41 | inc ecx |
| | 0075FE4C | EB D6 | jmp 0075FE27 |

The following three basic blocks are relocated away from the rest of the basic blocks because they were not executed during execution of the instrument ed computer program.

| | Id: B11 Size: 0xd(13) BidFollower: B12 BidTarget: nil | | |
|---|---|---|---|
| 0 | 00800000 | 8B 4C 24 10 | mov ecx,dword ptr [esp+10] |
| | 00800004 | 8A 11 | mov dl,byte ptr [ecx] |
| | 00800006 | 88 10 | mov byte ptr [eax],dl |
| | 00800008 | 41 | inc ecx |
| | 00800009 | 84 D2 | test dl,dl |
| | 0080000B | 74 DC | je 0075FE41 |
| | Id: B12 Size: 0x2(2) BidFollower: B13 BidTarget: B12 | | |
| 0 | 0080000D | 8B FF | mov edi,edi |

-continued

| | Id: B13 Size: 0xa(10) BidFollower: nil BidTarget: nil | | |
|---|---|---|---|
| 0 | 0080000F | 40 | inc eax |
| | 00800010 | 8A 11 | mov dl,byte ptr [ecx] |
| | 00800012 | 88 10 | mov byte ptr [eax],dl |
| | 00800014 | 41 | inc ecx |
| | 00800015 | 84 D2 | test dl,dl |
| | 00800017 | 75 F6 | jne 0080000F |
| | 00800019 | E9 FF F5 FE 23 | jmp 0075FE41 |

In other embodiments of the present invention, further optimizations may be made to the computer program 116 by replacing rarely executed instructions with other instructions that require a smaller amount of storage space. For example, a conditional branch instruction typically occupies 5–6 bytes of storage space, while a conditional branch-to-self instruction typically occupies 2 bytes of storage space. After using the previously-described methods to identify and separate live code blocks from dead code blocks, conditional branches from the live code to the dead code may be identified and replaced by conditional branch-to-self instructions. For each replacement, a savings of 3–4 bytes of storage space is realized. The execution of a conditional branch-to-self instruction results in an execution of an "infinite loop" when the condition is met (i.e., transfer to a rarely executed code block). A monitor process detects when a program is executing such an infinite loop and causes the program to branch to the rarely executed code.

Figure 9:
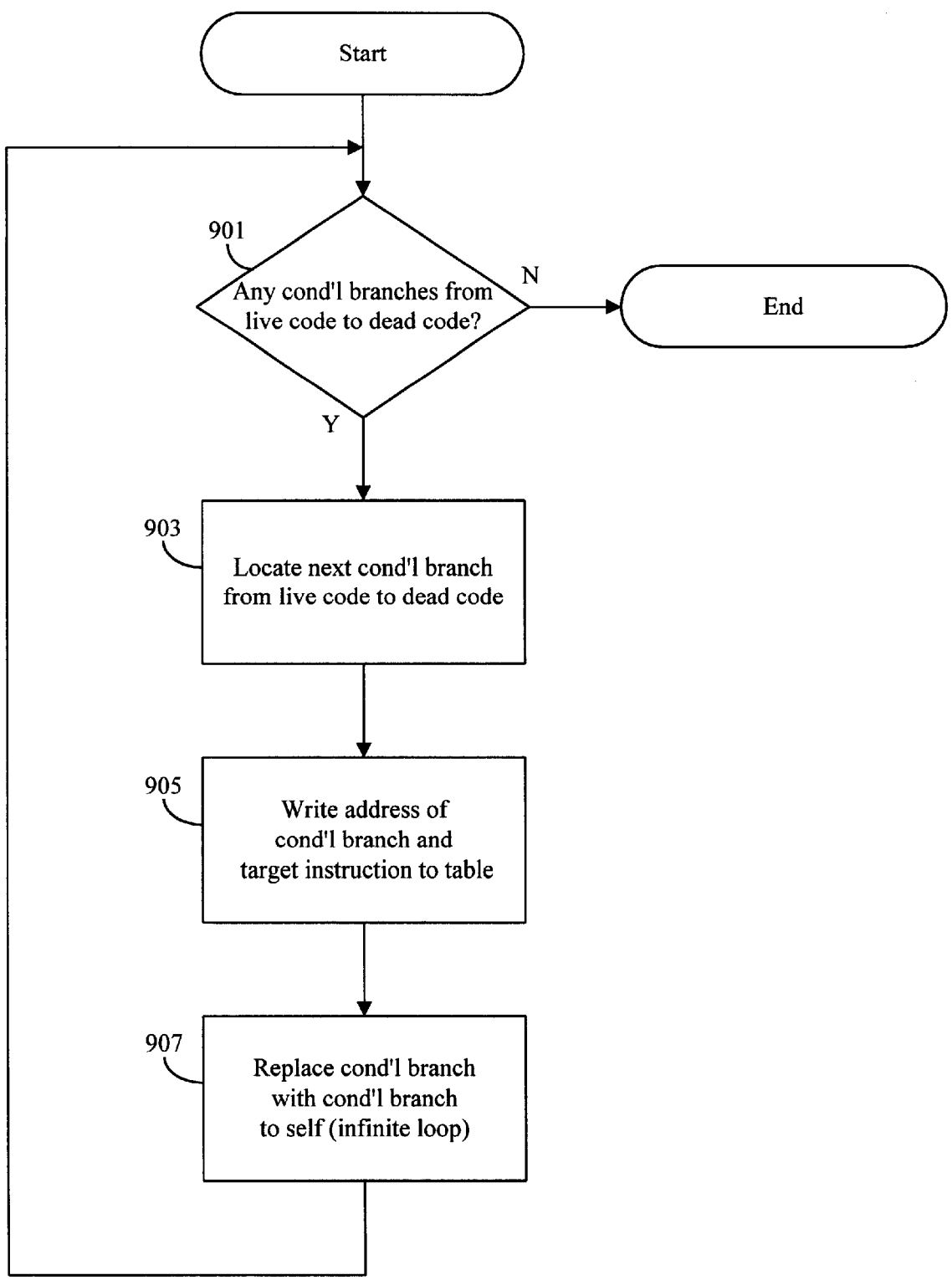
FIG. 9 is a flow diagram of a method used in an alternate embodiment of the present invention to identify conditional branch instructions within the computer program and replace each conditional branch instruction with a branch-to-self instruction.

FIG. 9 is a flow diagram of a method used in this alternate embodiment of the present invention to identify conditional branch instructions within the computer program and replace each conditional branch instruction with a conditional branch-to-self instruction. In steps 901–903, the optimizer program 114 examines the executable image, searching for a conditional branch instruction that branches from live code to dead code. In step 905, the optimizer program 114 stores the address, or index from some location within the executable image, of the located conditional branch instruction and the address of the conditional branch instruction's target instruction in a storage data structure such as a table. In step 907, the optimizer program 114 replaces the located conditional branch instruction with a conditional branch-to-self instruction. Execution of the conditional branch-to-self instruction will cause an infinite loop to occur when the condition is met.

Figure 10:
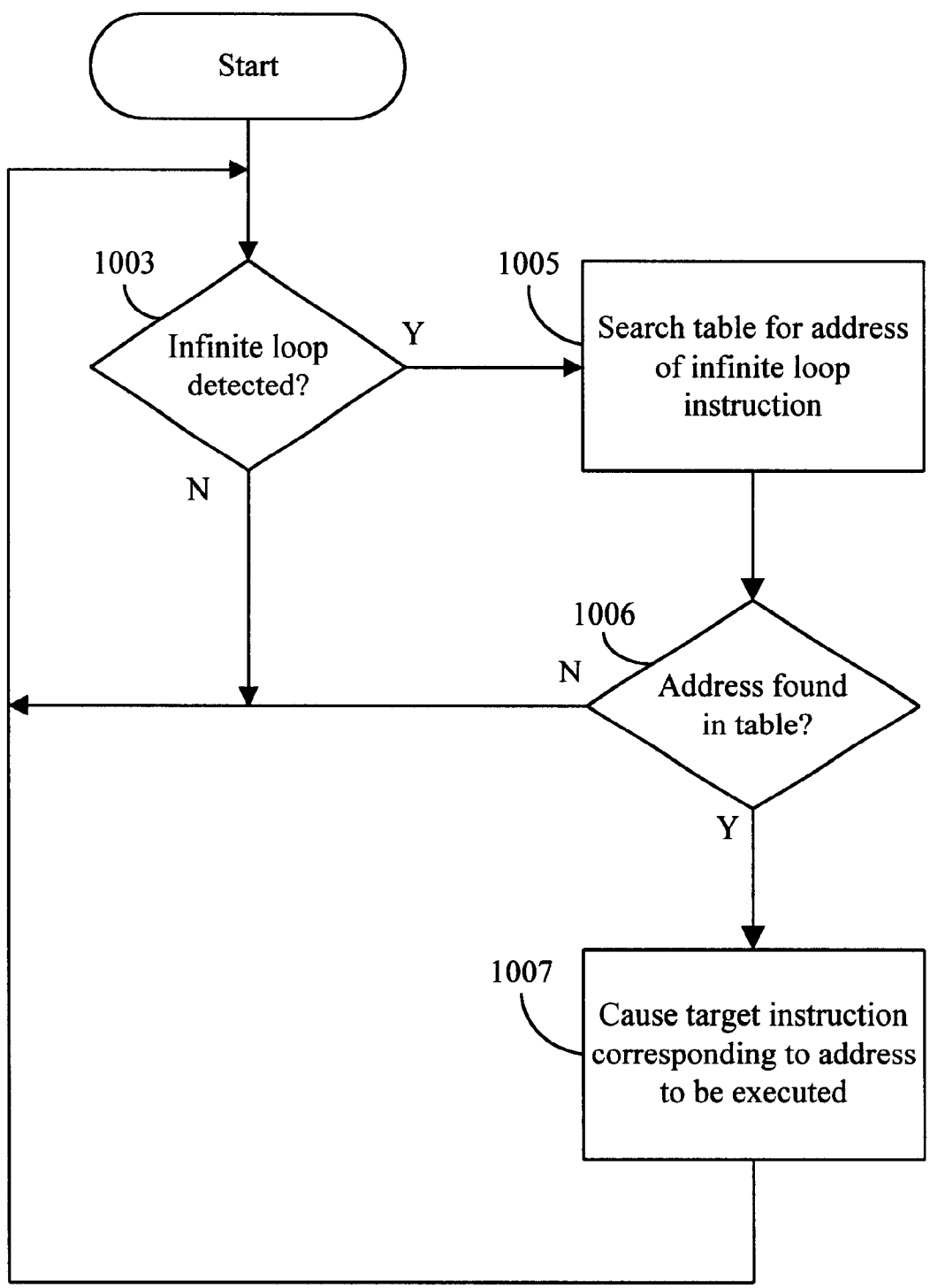
FIG. 10 is a flow diagram of a monitoring process used to identify the execution of a branch-to-self instruction in accordance with an alternate embodiment of the present invention.

This alternate embodiment also provides a monitoring process to monitor the executing computer program, detect an infinite loop, and take appropriate action. FIG. 10 is a flow diagram of a monitoring process used in this alternate embodiment of the present invention. When the monitoring process detects that an infinite loop is occurring (step 1003), in step 1005 the monitoring process determines the address of the instruction which caused the infinite loop and then searches the storage data structure for an entry matching the address. To detect that an infinite loop is occurring, the monitoring process reads the address stored in the program counter, determines which instruction is stored at that address, and, if the instruction stored at that address is a conditional branch-to-self, determines if the condition has been satisfied. One method of determining the address of the instruction which caused the infinite loop is reading the address currently stored in the program counter. If a matching entry is found in the storage data structure (step 1006), then in step 1007 the monitoring routine causes the monitored computer program to continue execution at the target instruction corresponding to the entry in the storage data structure. Preferably, the monitoring process is a background process, that is, the monitoring routine is assigned a lower priority than the executing computer program in the computer system's allotment of time to tasks so that the monitoring routine only gets a small percentage of processing time.

Although the present invention has been described in terms of a preferred embodiment, it is not intended that the invention be limited to this embodiment. Modifications within the spirit of the invention will be apparent to those skilled in the art; the scope of the present invention is defined by the claims which follow.

We claim:

1. In a computer system, a method for restructuring a computer program, the method comprising:

analyzing a linked executable computer program independent of the source for said program to identify a plurality of basic blocks;

determining how many times each basic block is accessed during execution of the computer program on the computer system;

determining a placement order for each basic block based upon the determined number of times basic block is accessed during execution of the computer program; and relinking the plurality of basic blocks according to the determined placement for each basic block.

2. The method according to claim 1 wherein the step of determining how many times each basic block of the executable program is accessed includes:

inserting instrumentation code at a location within each identified basic block to create an instrumented computer program, the instrumentation code containing instructions that, when executed on the computer system cause execution data to be recorded for each basic block, the execution data including how many times the basic block is accessed; and executing the instrumented computer program on the computer system and recording the execution data for each basic block.

3. The method according to claim 1 wherein each basic block of the executable program is a source block and each source block has an exit instruction defining a flow of control from the source block to one or more destination blocks, and wherein the step of determining a placement order for each basic block includes:

assigning a priority value to each exit instruction based upon the number of times the source block containing the exit instruction is accessed during execution of the computer program; and for each exit instruction;

determining whether the source block containing the exit instruction has been assigned a placement order, if the source block containing the exit instruction has not been assigned a placement order, then for each of the one or more destination blocks associated with the exit instruction, determining whether the destination block has been assigned a placement order, and if the destination block has not been assigned a placement order, assigning consecutive placement orders to the source block and the destination block.

4. The method according to claim 1 wherein determining a placement order for each basic block of the executable program includes:

receiving data identifying a separation value;

for each basic block, comparing the determined number of times the basic block is accessed during execution of the computer program with the separation value;

if the determined number of times the basis block is accessed during the execution of the computer program is greater than the separation value, then appending the basic block to a list of active basic blocks, and if the determined number of times the basic block is accessed during execution of the computer program is less than or equal to the separation value, then appending the basic block to a list of inactive basic blocks; and assigning consecutive placement orders to the basis blocks in the list of active blocks and the list of inactive blocks.

5. The method of claim 1 wherein the executable computer program was generated from source code, and wherein analyzing the linked executable program includes analyzing the executable computer program to identify a plurality of basic blocks without reference to the source code from which the executable computer program was generated.

6. The method of claim 1 wherein analyzing the linked executable program includes:

identifying in the executable computer program a jump table containing one or more destination addresses; and identifying a basic block beginning at one of the contained destination areas.

7. The method of claim 6 wherein the executable computer program was generated from source code, and wherein analyzing the linked executable program includes analyzing the executable computer program without reference to the source code from which the executable computer program was generated.

8. The method of claim 1 wherein the basic blocks are identified by analyzing jump tables without need for a compiler.

9. The method of claim 1 and further comprising inserting a call to a function in each block for determining how many times each block is accessed.

10. The method of claim 9 wherein the call to a function is inserted in selected blocks preceding an exit instruction.

11. The method of claim 10 wherein the call to a function is inserted immediately preceding the exit instruction of each selected block.

12. The method of claim 10 and further comprising adjusting addresses to account for the insertion of the call to a function in selected blocks.

13. The method of claim 12 wherein the relinking of blocks comprises adjusting addresses.

14. The method of claim 1 and further comprising resolving basic blocks in a breadth first fashion to maximize identification of a code block immediately following a jump table.

15. In a computer system, a method of reducing the working set of a program comprising:

analyzing a linked executable computer program to identify a plurality of code portions independent of the source code for such program, each code portion having a placement order within the executable computer program;

reatranging the placement order of code portions so that code portions which are frequently accessed during execution of the computer program on the computer system are grouped together; and relinking the plurality of code portions according to the rearranged placement orders.

16. The method of claim 15, wherein code portions of the executable program that have been frequently accessed have a priority value greater than a separation value and code portions that have not been frequently accessed have a property value less than the separation value, and wherein rearranging includes;

for each code portion, appending the code portion to an active list of code portions when the code portion is not frequently accessed; and for each code portion, appending the code portion to an inactive list of code portions when the code portion is not frequently accessed; and after all of the code portions have been appended to either active list or the inactive list, appending the inactive list of code portions to the active list of code portions to create rearranged placement orders.

17. The method of claim 5 wherein the executable computer program was generated from source code, and wherein the analyzing step analyzes the executable computer program without reference to the source code from which the executable program was generated.

18. A computer-readable medium whose contents cause a computer system to restructure a computer program by performing the steps of:

analyzing a linked executable computer program independent of the source code for such program to identify a plurality of basic blocks;

collecting information on the execution of each basic block during execution of the linked computer program on the computer system;

determining a placement order for the basic blocks based upon the collected information for each basic block; and relinking the plurality of basic blocks according to the determined placement order for the basic blocks.

19. The computer-readable medium of claim 18 wherein collecting information includes:

inserting instrumentation code at a location within each identified basic block to create an instrumented computer program, the instrumentation code containing instructions that, when executed on the computer system, cause execution data to be recorded for each basic block, the execution data including how many times the basic block is accessed; and executing the instrumented computer program on the computer system and recording the execution data for each basic block.

20. The computer-readable medium of claim 18 wherein each basic block of the executable program is a source block and each source block has an exit instruction defining a flow of control from the source block to one or more destination blocks, and wherein determining a placement order for the basic blocks includes, for each source block:

assigning a priority value to each exit instruction based upon the number of times the source block containing the exit instruction is accessed during execution of the computer program; and for each exit instruction, determining whether the source block containing the exit instruction has been assigned a placement order, if the source block containing the exit instruction has not been assigned a placement order, then for each of the one or more destination blocks associated with the exit instruction, determining whether the exit instruction has not been assigned a placement order, and if the destination block has not been assigned a placement order, assigning consecutive placement orders to the source block and the destination block.

21. The computer-readable medium of claim 18 wherein determining a placement order for the basic blocks of the executable program includes:

receiving data identifying a separation value;

for each basic block, comparing the determined number of times the basic blocks is accessed during execution of the computer program with the separation value, if the determined number of times the basic blocks is accessed during execution of the computer program is greater than the separation value, then appending the basic block to a list of active basic blocks, and if the determined number of times the basic block is accessed during the execution of the computer program is less than or equal to the separation value, then appending the basic block to a list of inactive basic blocks; and assigning consecutive placement orders to the basic blocks in the list of active blocks and the list of inactive blocks.

22. The computer-readable medium of claim 18 wherein the executable computer program was generated from source code, and wherein analyzing the linked executable program includes analyzing the executable program to identify a plurality of basic blocks without reference to the source code from which the executable computer program was generated.

23. The computer-readable medium of claim 18 wherein analyzing the linked executable program includes:

identify in the executable computer program a jump table containing one or more destination addresses; and identifying a basic block beginning at one of the contained destination areas.

24. The computer-readable medium of claim 23 wherein the executable computer program was generated from source code, and wherein analyzing the linked executable program includes analyzing the executable computer program without reference to the source code from which the executable computer program was generated.

25. A computer-readable medium whose contents cause a computer system to reduce the working set of a computer program by:

analyzing a linked executable computer program to identify a plurality of code portions, each code portion having a placement order within the executable computer program;

rearranging the placement order of code portions to that code portions which are frequently accessed during execution of the computer program on the computer system are grouped together; and relinking the plurality of code portions according to the rearranged placement orders.

26. The computer-readable medium of claim 25 wherein code portions of the executable program that have been frequently accessed have a priority value greater than a separation value and code portions that have not been frequently accessed have a priority value less than the separation value, and wherein rearranging the placement order of code portions includes:

for each code portion, appending the code portion to an active list of code portions when the code portion is frequently accessed;

for each code portion, appending the code portion to an inactive list of code portions when the code portion is not frequently accessed; and after all of the code portions have been appended to either the active list or the active list, appending the inactive list of code portions to the active list of code portions to create rearranged placement orders.

27. The computer-readable medium of claim 25 wherein the executable computer program was generated from source code, and wherein analyzing the linked executable program includes analyzing the executable computer program without reference to the source code from which the executable computer program was generated.

* * * * *